United States Patent [19]

Faith

[11] 4,313,536
[45] Feb. 2, 1982

[54] CONVEYOR AND CONTROL THEREFOR

[75] Inventor: Frederick E. Fauth, Towson, Md.

[73] Assignee: American Bottlers Equipment Co., Inc., Owings Mills, Md.

[21] Appl. No.: 132,683

[22] Filed: Mar. 21, 1980

[51] Int. Cl.³ ............................................. B65G 13/06
[52] U.S. Cl. .............................. 198/781; 74/665 GA; 198/791
[58] Field of Search ............................ 198/780–782, 198/787, 789–791, 347, 779, 842; 74/665 GA, 665 G; 64/2 R; 193/35 R, 35 A; 308/20

[56] References Cited

U.S. PATENT DOCUMENTS

| | | | |
|---|---|---|---|
| 1,308,686 | 7/1919 | Spirek | 198/780 |
| 1,749,431 | 3/1930 | Johnson | 198/791 |
| 1,856,669 | 5/1932 | Sylvester | 198/783 |
| 2,549,490 | 4/1951 | Kuhl | 74/665 GA |
| 2,622,720 | 12/1952 | Lorig | 198/787 |
| 2,624,445 | 1/1953 | Wallman | 198/787 |
| 2,712,377 | 7/1955 | Eggleston | 198/789 |
| 2,769,515 | 11/1956 | Thomas et al. | 193/35 A |
| 3,268,059 | 8/1966 | Hill | 198/787 |
| 3,327,837 | 6/1967 | Covell | 198/789 |
| 3,369,646 | 2/1968 | Musser | 198/789 |

FOREIGN PATENT DOCUMENTS

903190  2/1954  Fed. Rep. of Germany ...... 198/789

*Primary Examiner*—Joseph E. Valenza
*Attorney, Agent, or Firm*—Cantor and Singer

[57] ABSTRACT

A conveyor using rollers as the conveying surface and driven by a drive unit composed of a drive gear mounted on a drive shaft and driving a number of pinion gears each of which is connected to a roller through a flexible shaft. A sprocket wheel is mounted for free rotation on the drive shaft and pair of thrust washers is fixed to the drive shaft on either side of the sprocket wheel. The thrust washers are biased against the sprocket wheel by a spring which provides an adjustable torque. A number of modules containing rollers and a drive unit as just described are mounted together to form a conveyor system.

27 Claims, 15 Drawing Figures

CONVEYOR AND CONTROL THEREFOR

BACKGROUND OF THE INVENTION

This invention relates to transfer mechanisms and more particularly this invention relates to a transfer mechanism for transporting containers and drive means therefor.

Transfer or conveying mechanisms have a long history in various industries which rely on the transport of articles from one location to another during processing. There are many such constructions which are used with varying degrees of success. Most of these constructions rely on the use of an "endless" conveyor means in the form of an endless chain having individual links hingedly connected together. One such conveyor construction is disclosed in U.S. Pat. No. 3,491,873 in conjunction with a guide rail and a sanitary construction for use in the food, dairy, brewing, and softdrink industries. Other types of chain conveyors are also commonly used.

While conveyor systems utilizing chains are useful and efficient for some applications, they suffer certain disadvantages when used for other applications. For instance, when changing direction on a conveyor line, it is often necessary to locate a portion of a conveyor next to a portion of another conveyor and provide guide rails to shift the moving containers from one conveyor to the other. Then, when transferring articles from one conveyor to another, whether the articles are to proceed in the same direction or another direction, a so-called "dead plate" is required between conveyor stations. There is a disadvantage inherent in the use of a dead plate in that articles can be pushed up on to a dead plate but then, if there are no articles immediately following them to push them further on, they can remain on the dead plate without transferring to the next conveyor section. Furthermore, if the articles are of an unstable type, there is the possibility of falling over when being pushed on to, or off of, the dead plate.

Probably the most significant disadvantage of conveyors that use chains to support the articles being conveyed is that the chains have a high friction when sliding under articles that have been stopped by reason of machinery stoppage or simply backing up of articles on the conveyor. The most successful conveyor construction for avoiding this problem is that which is based on the use of a plurality of rollers instead of a flat top chain. These conveyors are particularly useful for small or inherently unstable articles because they are usually constructed in such a way that when the articles stop for one reason or another, the rollers stop, when slippage being provided at the rollers or by a slipping belt or pulley. Also, when the articles are moving, since the rollers are also moving in the same relative direction, there is no relative movement between the surface of the roller and the article.

One prior art construction of the roller type utilizes a drive system wherein a drive shaft is located below the rollers and elastomeric belts are used to transfer the rotational movement from the drive shaft to a series of roller shafts upon which the individual rollers are mounted. Thus, a number of belts equal to the number of rollers is necessary. Furthermore, for changing direction of the articles being conveyed, a complex system of rollers facing in different directions is necessary whereby an article being conveyed cannot change its direction by more than 45 degrees and a directional change greater than that requires step-wise movement. Also, due to the construction of these conveyors, it is not possible to utilize rollers of a small diameter, thereby limiting roller-type conveyors to use only where fairly large articles are being conveyed.

Another prior art construction also relies on a drive shaft located beneath the rollers and elastomeric belts connecting the rollers and the drive shaft. But this construction also utilizes slippage pulleys mounted on the drive shaft with the elastomeric belts then mounted on the pulleys.

BRIEF SUMMARY OF THE INVENTION

With the foregoing background of the invention in mind, and as the following description of the invention proceeds it will be appreciated that the primary object of the present invention is to provide a transfer mechanism for transporting articles which is free of the aforementioned and other such disadvantages.

It is another primary object of the present invention to provide a drive means for such a transfer mechanism.

It is a further object of the present invention to provide a transfer mechanism for transporting articles which eliminates the use of a dead plate in a conveyor system.

It is yet another object of the present invention to provide a transfer mechanism for transporting articles wherein there is a small contact area between the conveyor surface and the package.

It is still another object of the present invention to provide a transfer mechanism for transporting containers which minimizes damage to vulnerable packaging material.

It is another object of the present invention to provide a conveyor system comprising a plurality of transfer mechanisms of the roller-type wherein each such mechanism in the conveyor system includes a separate drive system, thereby obtaining flexibility in the movement of articles.

It is still a further object of the present invention to provide a conveyor system utilizing rollers of a small diameter.

In accordance with the foregoing objects, the invention resides in the use of a planar array of a plurality of rollers driven by a plurality of drive elements located to one side of the rollers. The drive elements are in a linear array the projection of which intersects the plane of the rollers within the length of the conveyor surface defined by the rollers. The linear array of drive elements is preferably curvilinear or circular.

Consistent with the foregoing objects and description, in one aspect, the present invention is a transfer mechanism for transporting containers comprising a plurality of rollers forming a conveyor, means for supporting the rollers for rotation, and means for driving the rollers. An important aspect of the invention is the just mentioned driving means which comprises a drive gear, a plurality of pinion gears which are the drive elements disposed around the periphery of, and driven by, the drive gear, a flexible coupling connecting each of the rollers with one of the pinion gears for driving the rollers, means for driving the drive gear, and adjustable torque clutch means between the drive gear and the means for driving the drive gear. Thus, it will be appreciated that while the pinion gears are disposed in a circular array around the drive gear, the motion of the pinion gears is transferred by means of the flexible couplings to the rollers which are disposed in a linear array. The adjustable torque clutch means provides that a stoppage of one or more rollers due to a predetermined force exerted thereon, will cause the driving means to stop. Thus, the adjustable torque clutch means can be set to stop the driving means if there is a back-up of articles on the rollers. The flexible coupling is preferably a flexible shaft, but could be a rigid shaft with one or more universal joints.

In a preferred embodiment, the driving means for the rollers comprises a drive gear fixed to a drive shaft, a sprocket wheel rotatably mounted on the drive shaft, and a pair of thrust washers fixed against radial movement on the drive shaft on either side of the sprocket wheel, at least one of the thrust washers being axially moveable on said drive shaft, and being biased against the sprocket wheel. The thrust washer is preferably biased against the sprocket wheel by an adjustable spring. The sprocket wheel is driven by a chain or a cog belt which, in turn, is driven by a motor. By adjusting the spring pressure which biases the thrust washers against the sprocket wheel, the torque of the drive means is adjusted. Thus, when a predetermined pressure causes one or more rollers to stop, that stoppage is transmitted through the flexible shaft to the pinion gear and thence to the drive gear which causes the drive shaft to stop. The sprocket wheel then "free-wheels" on the drive shaft and slips against the thrust washers until the stoppage is cleared.

Another aspect of the present invention is a conveyor system comprising a plurality of the afore-described transfer mechanisms placed side-by-side, that is, with the last roller of each such mechanism being next to the first roller of each succeeding such mechanism. Thus, considering a preferred embodiment wherein each transfer mechanism comprises ten rollers with the associated driving means, a complete conveyor system would have a separate driving means for each ten rollers throughout the length of the system. A single prime mover, preferably a motor, can drive a number of individual driving means, such number being dependent on the size of the motor and other load factors and could be from eight or ten to several hundred. The motor could have a sprocket wheel mounted on its shaft with the chain or cog belt connected to the sprocket wheel, although any drive train known in the art could be interposed between the motor and the chain or cog belt.

A particular advantage of the instant invention resides in the fact that each group of up to ten rollers is driven by a single driving means. Thus, differences in speed, direction, or the like can easily be built into a conveyor line by suitably changing gear ratios, sprocket wheel sizes, or direction of drive of any particular driving means.

BRIEF DESCRIPTION OF THE DRAWINGS

The foregoing objects and advantages will be described, and other objects and advantages of the instant invention will become apparent, from the following description of preferred and illustrative embodiments making reference to the annexed drawings wherein.

DESCRIPTION OF THE PREFERRED EMBODIMENTS

Figures 1, 4, 5:
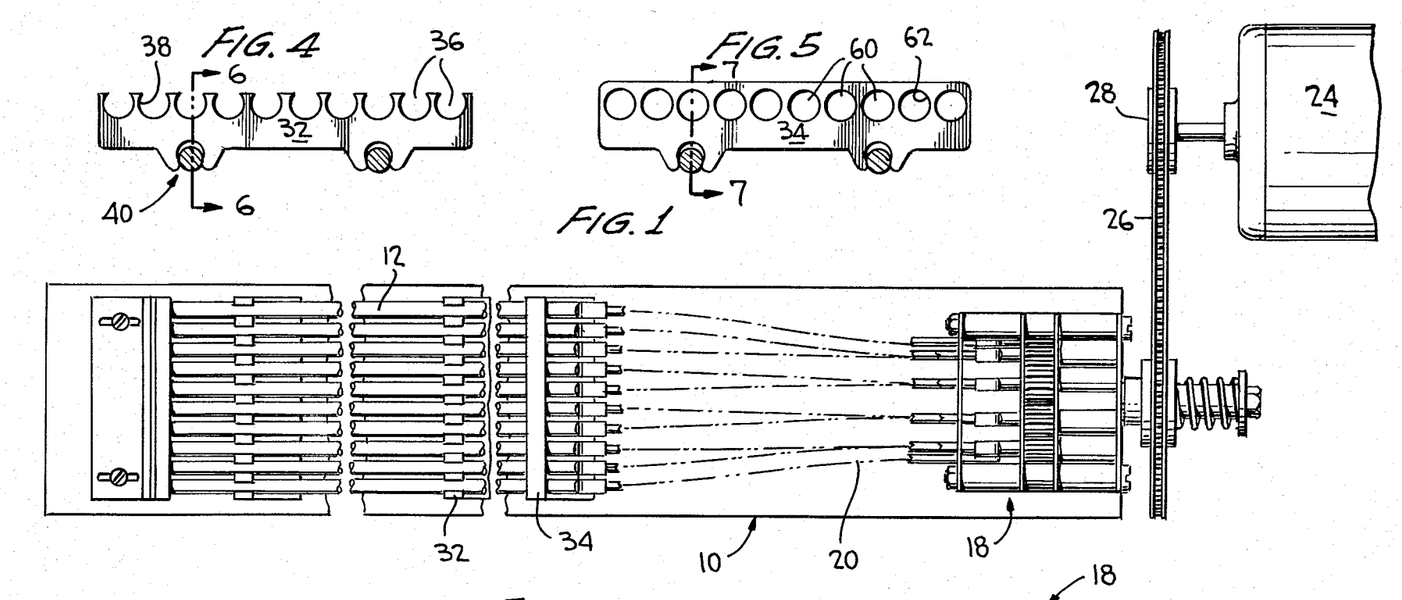
FIG. 1 is a top plan view of a transfer mechanism according to the present invention.
FIG. 4 is a front elevational view of one form of a support bearing for the rollers of the transfer mechanism.
FIG. 5 is a front elevational view of another form of a support bearing for the rollers of the transfer mechanism.
Figure 2:
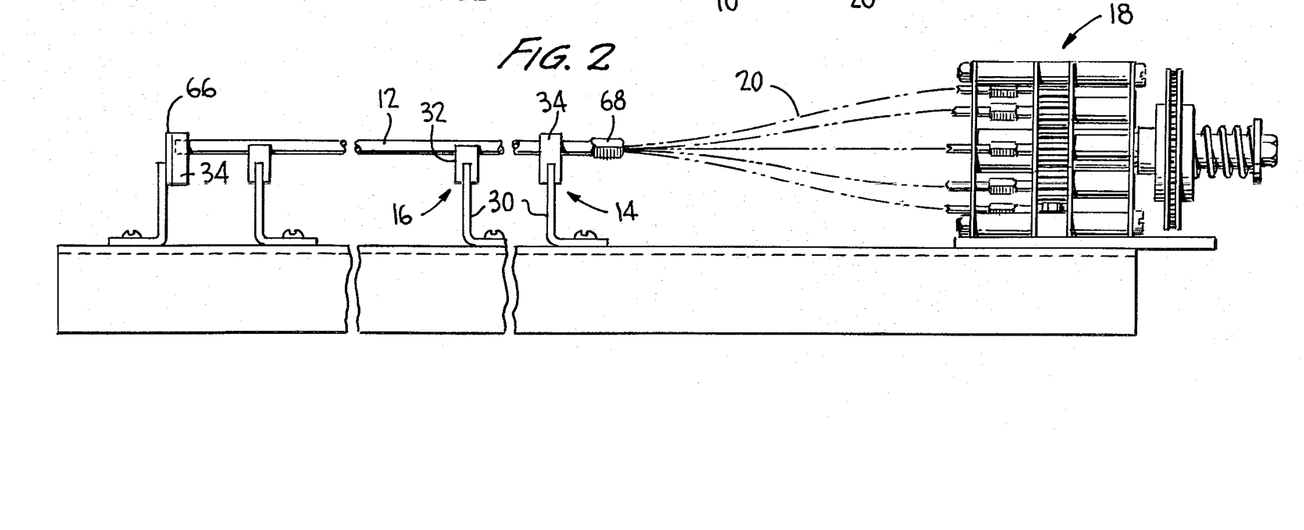
FIG. 2 is a side elevational view of the transfer mechanism of FIG. 1.

Referring first to FIGS. 1 and 2, the instant transfer mechanism, generally designated by the numeral 10, comprises a planar array of rollers 12 mounted for rotation on support means 14 and 16 and connected to a driving means generally designated by the numeral 18 by means of flexible shafts 20 or other suitable flexible connecting means such as flexible or universal shafts. While there is no particular limitation as to how many rollers 12 can be driven by a drive unit 18, it will be appreciated by one skilled in the art that there are practical limitations based on the size of the rollers 12, the sizes of the respective gears in drive unit 18 which will be described in more detail herein below, and by the size of the prime mover. For practical considerations, the instant invention is most useful with rollers ranging from about 3/16 inch to about 2 inches in diameter with the flexible shafts 20 and the various gears being proportionally sized. In the most useful embodiment, for conveying articles having bases as small as $\frac{3}{8}$ inch and with no upper limit on size except as may be dictated by practical considerations, the rollers are $\frac{1}{4}$ inch in diameter and based on a 5/16 inch pitch, that is, 1/16 inch clearance between rollers. In this most preferred embodiment, it has been found that ten rollers per transfer mechanism are most convenient. For convenience of description, the transfer mechanism 10 will hereafter be referred to as a "module" 10. It is preferred that the longitudinal dimension L1 of drive unit 18 is within the bounds of the longitudinal dimension L2 of the planar array of rollers 12 driven thereby.

Figure 3:
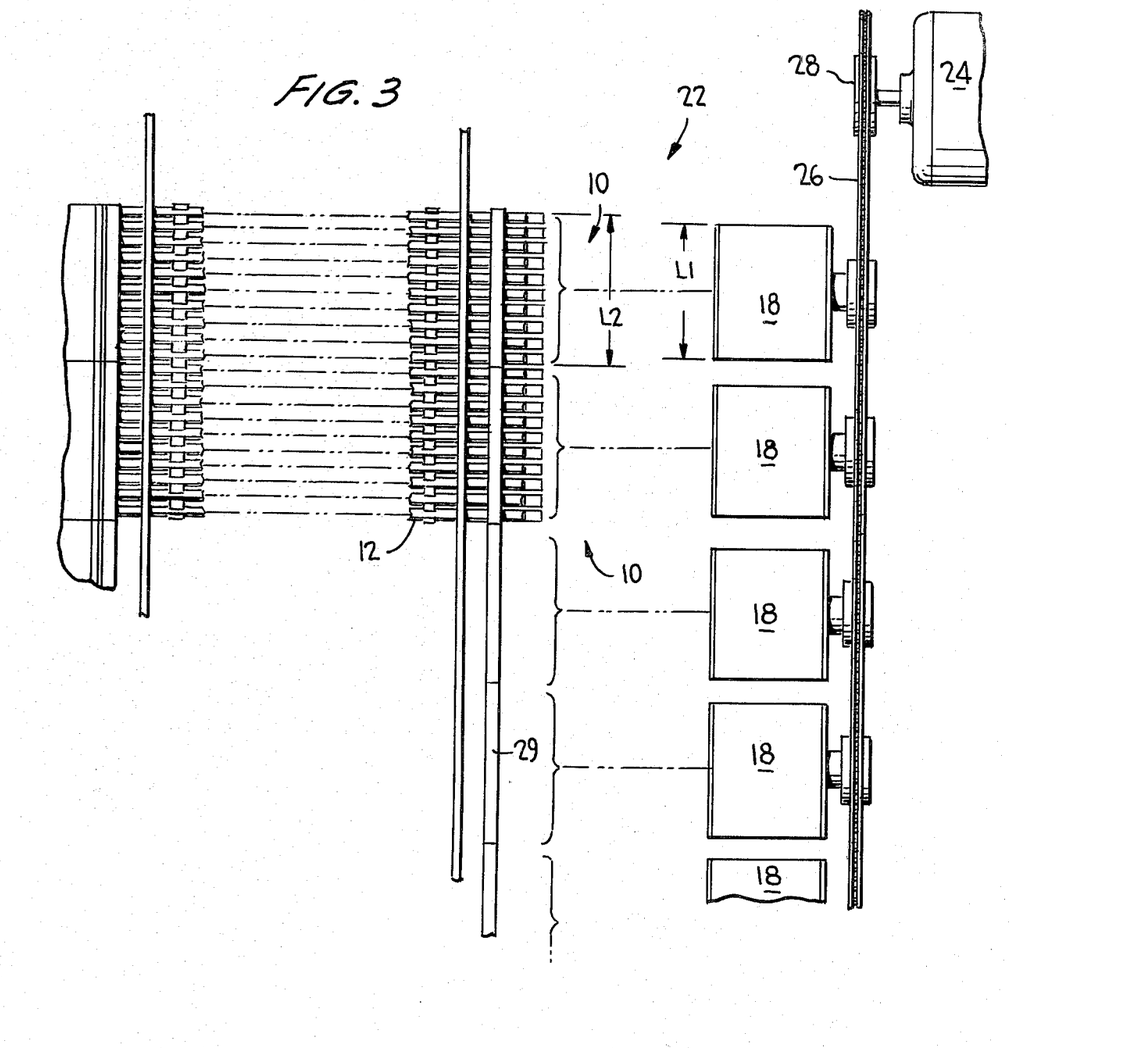
FIG. 3 is a top plan view showing diagrammatically a conveyor system comprising a plurality of transfer mechanisms as shown in FIG. 1.

FIG. 3 illustrates a conveyor system 22 comprising a plurality of modules 10 aligned side-by-side and driven by a single motor 24 as the prime mover through a chain 26. As will be appreciated by one skilled in the art, a cog belt or other suitable means could be used instead of chain 26. In addition, while chain 26 is shown directly connected to motor 24 through sprocket wheel 28, one skilled in the art will realize that motor 24 could be located remote from the conveyor system and adapted to drive the chain 26 through the intermediary use of a drive shaft or other known linkage or transmission system. Depending on the load factors already mentioned, it can easily be determined how many modules 10 can be driven by a single motor 24. Such a conveyor system could be straight, curved, could include turns or changes of direction, could be level, or could be inclined upwardly or downwardly and would, of course, have suitable guide rails 29 of a conventional type, such as those in U.S. Pat. No. 3,491,873. This conveyor is useful, as already mentioned, in bottling and packaging plants to convey containers from one location to another. It can be used in conjunction with warmers, de-palletizers, pasturizers, bottle cleaner load tables, accumulator tables, or the like. It can handle aluminum cans, glass or plastic bottles, boxes, and a variety of other containers. The bottles can be glass bottles or plastic covered bottles such as the so-called Plastishield and can have stippled bottoms or even a petaloid base.

As will be seen from FIG. 2, support means 16 comprises support member 30 and bearing member 32, while support means 14 comprises support member 30 and bearing member 34. Referring to FIG. 4, bearing member 32 is shown as being an elongated strip having a plurality of openings 36 in which rollers 12 rest and are supported for rotational movement. Bearing members 32 can be fabricated of any suitable material such as nylon which provides a suitable bearing surface 38 for rollers 12. In the preferred embodiment, each bearing member 32 is of a size sufficient to support ten rollers 12. On the lower longitudinal edge of bearing member 32 are a pair of mounting means 40 which can be seen more clearly in FIGS. 6 and 8. Each mounting means 40 comprises a circular opening 42 which is open at the bottom and has a pair of depending legs 44 and 46 on either side thereof.

Figure 6:
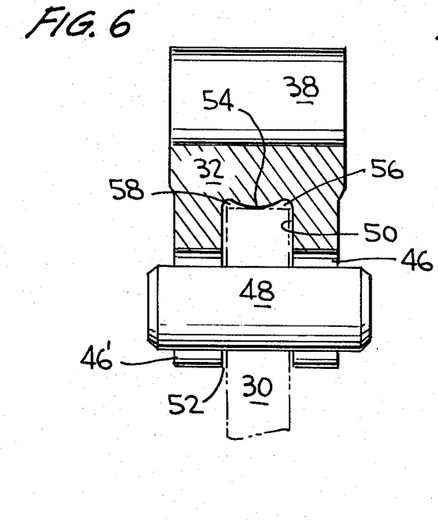
FIG. 6 is a cross-sectional view of the support bearing of FIG. 4 taken on the line 6—6 of FIG. 4.
Figure 8:
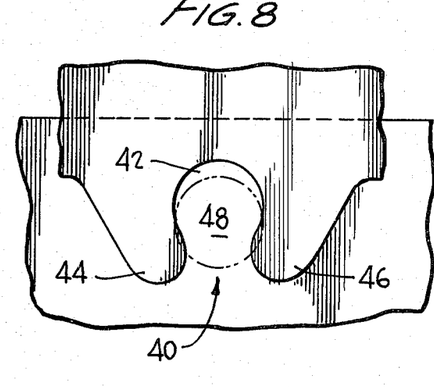
FIG. 8 is an enlarged elevational view of the mounting means of the support bearings of FIGS. 4 and 5.

Support member 30, made of any suitable material such as stainless steel, has holes bored therethrough at suitable spaced apart positions and pins 48 inserted in the holes. Legs 44 and 46, which are resilient due to the nature of the material of which bearing member 32 is made, are clamped over pin 48 on either side thereof as shown in FIG. 8. Furthermore, as can be seen in FIG. 6, there are front legs 44 and 46 and rear legs corresponding to the front legs with a slot 50 therebetween. One of the rear legs, 46' is shown in FIG. 6. Slot 50 is slightly wider than the thickness of support means 30 to provide a small clearance 52 between support member 30 and the walls defining slot 50. Also, as will be seen in FIG. 6, the upper surface of slot 50 is slightly convex as indicated by the numeral 54, thereby providing clearances 56 and 58 above support member 30. These clearances 52, 56, and 58 allow for self-alignment of bearing member 32 when rollers 12 are placed thereon, thereby eliminating the need for precise tolerances in manufacture and installation of the conveyor. The spacing between each of the support means 16 can easily be determined by one skilled in the art, this being determined by load considerations. The support means are sufficiently spaced apart to prevent a downward bowing of rollers 12 when a heavy load is placed thereon. In addition, as will be seen from FIG. 3, each support member 30 is of a length sufficient to support a plurality of bearing members 32. Thus, if a conveyor system is assembled made up of eight modules, each support member 30 would hold eight bearing members 32.

Comparing FIGS. 4 and 5, it will be seen that the difference between bearing member 32 and bearing member 34 is that bearing member 32 has holes 36 which are open at the top and provide bearing surfaces 38 while bearing member 34 provides openings 60 defining bearing surfaces 62. Openings 60 are circular openings and are closed at the top. Generally, bearing member 34 is used at the ends of rollers 12 while bearing members 32 are used intermediate the ends of rollers 12, leaving the upper surface of the rollers unimpeded.

Figure 7:
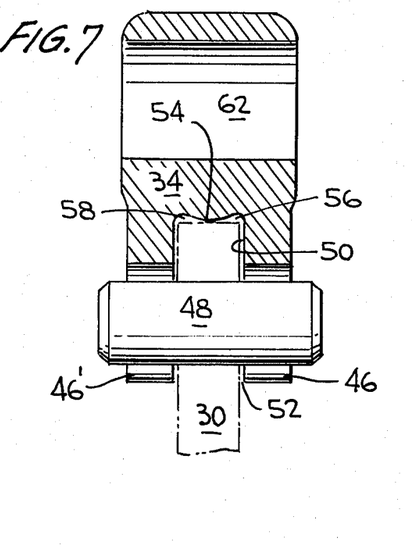
FIG. 7 is a cross-sectional view of the support bearing of FIG. 5 taken on the line 7—7 of FIG. 5.

Comparing FIGS. 6 and 7, it will be noted that the self-aligning mounting on support member 30 is the same for both bearing member 32 and bearing member 34, the only difference being the open holes 36 in bearing member 32 and the closed holes 60 in bearing member 34. FIG. 8 is equally applicable to bearing member 34 as it is to bearing member 32.

As is clearly seen in FIGS. 1 and 2, the end of roller 12 which is connected to drive means 18 by flexible shaft 20 extends through bearing member 34. But, there may be a situation wherein it is desired that the opposite end of roller 12 not extend through its respective bearing member 34. In that case, stop plate 66 may be provided to prevent rollers 12 from sliding axially through the bearing members.

Figure 9:
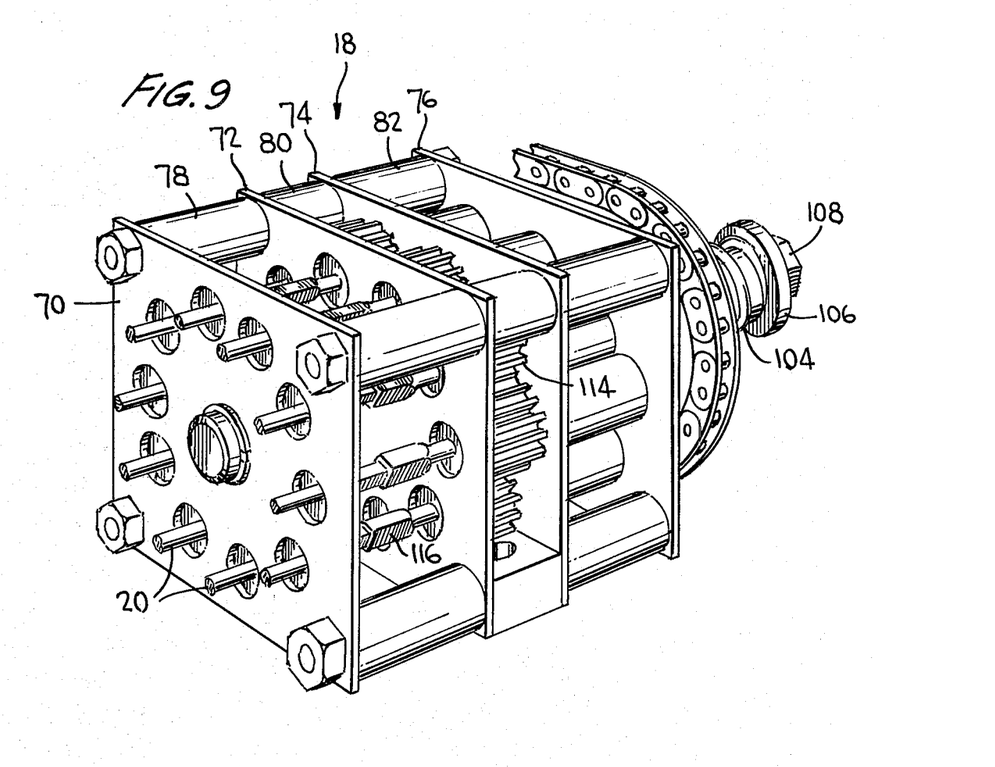
FIG. 9 is a perspective view of the inventive drive unit.

Attention is now directed to FIG. 9 which depicts drive unit 18 and a portion of rollers 12 with their respective flexible shafts 20. The near end of each roller 12 has an axial hole drilled therein and is then formed into a square using a conventional forming tool. The crimped squared end is denoted 68. The resulting square opening receives the end of flexible shaft 20, the other end of which is connected in a similar manner to the respective pinion shaft in drive unit 18. It will be seen that drive unit 18 includes a plate 70 having a circular array of holes aligned with the pinion shafts through which flexible shafts 20 pass.

Figure 10:
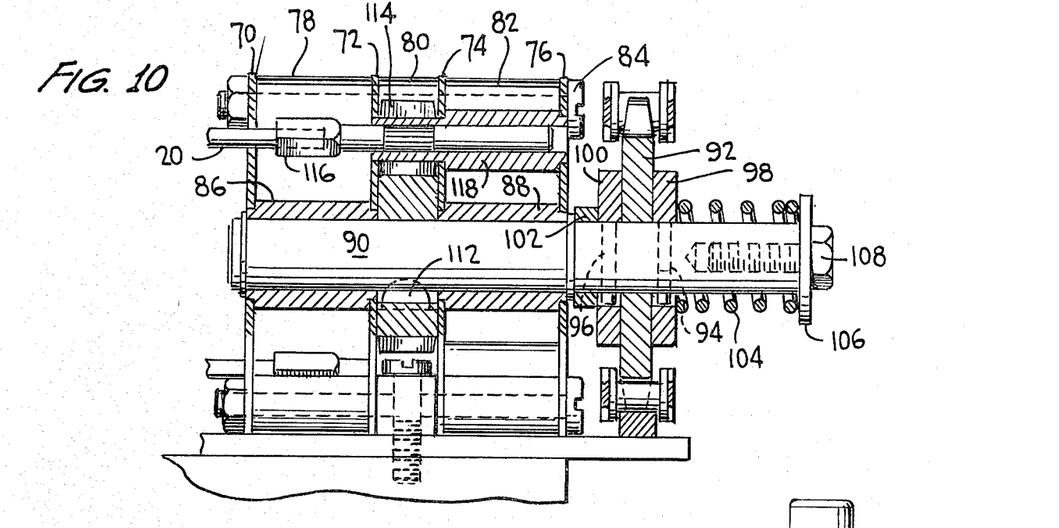
FIG. 10 is a side elevational view, in cross-section, of the drive unit of FIG. 9.

Reference is now had to FIG. 10 from which the details of the inventive drive unit can be ascertained. In addition to mounting plate 70 there are provided mounting plates 72, 74, and 76 suitably spaced apart by spacers 78, 80, and 82 and joined by any suitable fastening means such as nut and bolt assembly 84. If desired, a suitable housing (not shown) can be provided.

Bushing 86 is provided between mounting plates 70 and 72 and bushing 88 is provided between mounting plates 74 and 76. Bushings 86 and 88 together constitute bearings in which drive shaft 90 rotates. At one end of drive shaft 90 is mounted sprocket wheel 92. Sprocket wheel 92 is a standard sprocket wheel which is available commercially. It is mounted on drive shaft 90 in such a way that absent other means not yet described, it would free-wheel on drive shaft 90 without turning the drive shaft. A pair of holes are drilled through drive shaft 90 on either side of sprocket wheel 92 and pins 94 and 96 are inserted therethrough over which thrust washers 98 and 100 are inserted. Thrust washers 98 and 100 have keyways which seat on pins 94 and 96. Thus, thrust washers 98 and 100 are mounted on drive shaft 90 in such a way that they are fixed against relative rotation. But, at least one of thrust washers 98 and 100 is axially movable on drive shaft 90. Thrust washer 100 is seated between sprocket wheel 92 and spacer or bearing 102. Thrust washer 98 is biased against sprocket wheel 92 by spring 104 which bears against washer 106 which, in turn, is secured to drive shaft 90 by means of bolt 108.

The torque can be adjusted by tightening or loosening bolt 108 as shown in phantom in FIG. 10. Also, spring 104 can be replaced by a spring of a greater or lesser force. Thrust washers 98 and 100 are fabricated of any suitable material having a low starting friction which is close to its running friction. By "starting friction" is meant that coefficient of friction, relative to the material of sprocket wheel 92, which enables sprocket wheel 92 to cause the thrust washers to begin to turn when a given force is applied in pressing the thrust washers against the sprocket wheel. This would be the frictional force required to overcome the various inertial forces. "Running friction" is that friction required to maintain the thrust washers turning when applied against the sprocket wheel once motion has begun. A suitable material, for example, is a self-lubricating, or sintered, bronze.

Drive gear 110 is affixed to drive shaft 90 by means of key 112. Disposed in a circular array around drive gear 110 are a plurality of pinion gears 114 which are fixed to pinion shafts 116 in a conventional manner such as by press fitting the gears 114 over a knurled portion of the shafts 116. Pinion gears 114 mesh with drive gear 110. Pinion shafts 116 ride in bushings 118 which are mounted between plates 74 and 76 and, thereby, provide bearings for pinion shafts 116. One end of pinion shaft 116 is bored and squared in the same manner as the ends of rollers 12 to receive an end of flexible drive shaft 20 which is a commercially available item. The drive gear 110, pinion gears 114, and bushings 86, 88, and 118, are fabricated of any suitable material such as nylon. The actual dimensions of the thrust washers as well as the other components of drive unit 18 are dictated by roller size and load factors, all of which are easily ascertainable by one skilled in the art.

Figure 14:
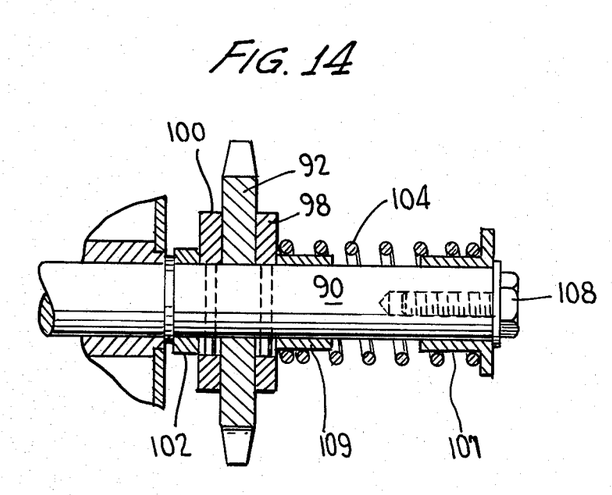
FIG. 14 is a side elevational view, in cross-section, of an alternate embodiment of the drive unit of FIG. 10.

In the embodiment of FIG. 14, guide sleeve 109 is mounted on drive shaft 90 near thrust washer 98 and sleeve 107 is substituted for washer 106. The spring 104 seats on sleeves 107 and 109. As with previous embodiments, once the predetermined torque is set by screwing bolt 108 in or out, the unit is preadjusted and no further adjustment is necessary.

Figure 15:
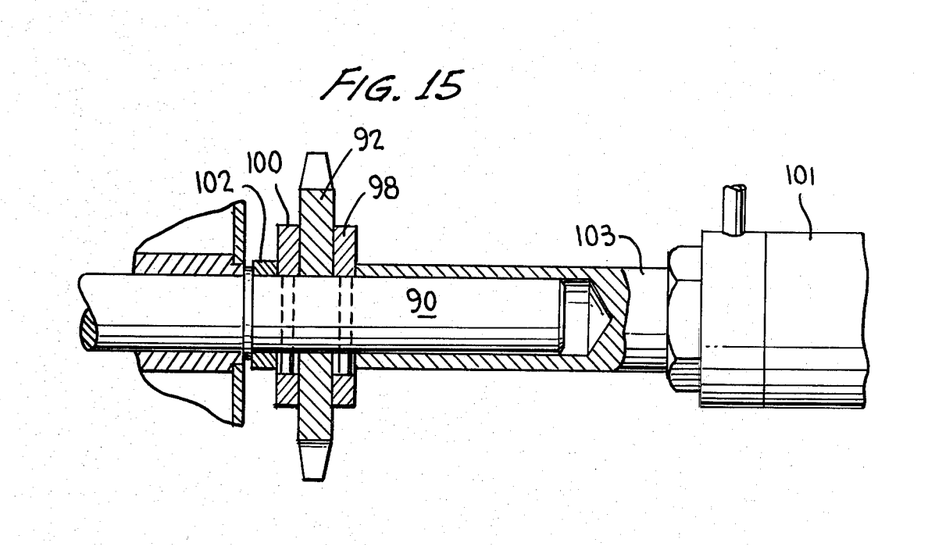
FIG. 15 is a side elevational view, in cross-section, of another alternate embodiment of the drive unit of FIG. 10.

FIG. 15 shows an embodiment in which a roller section can be instantly started or stopped responsive to any condition. A pneumatic cylinder 101 and piston 103 are substituted for spring 104. Piston 103 is hollow to rotateably receive drive shaft 90, with the end face of piston 103 butting against thrust washer 98. The cylinder is controlled in any conventional manner as by a solenoid or pneumatic sensors (not shown). It will be appreciated that when the piston is forced outwardly by pneumatic pressure, the thrust washers bear against the sprocket wheel to thereby turn the rollers, and vice versa.

Figure 11:
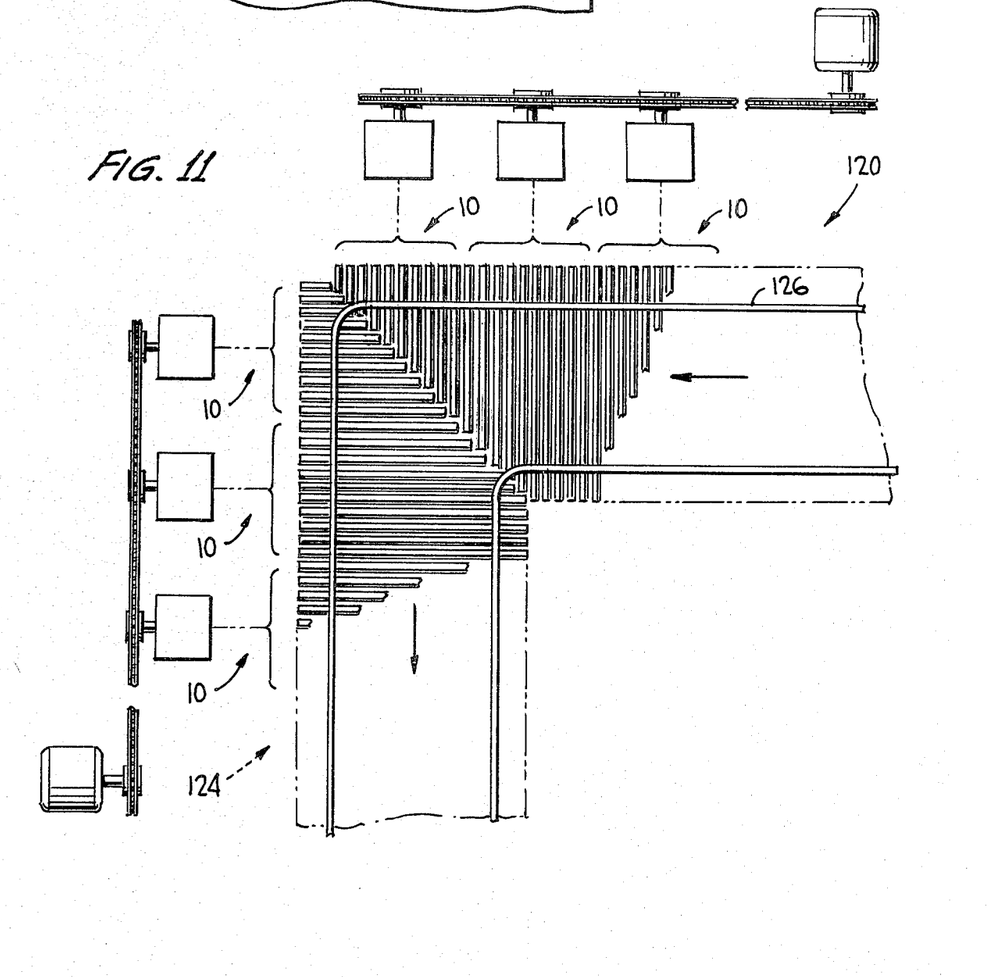
FIG. 11 is a diagrammatic top plan view of part of a conveyor system showing a right angle turn.

Now, turning to FIG. 11, there is shown a conveyor line in an installation wherein a 90° turn is required. Starting at the upstream end of the conveyor line, there are a plurality of conveyor systems 22 each comprising a plurality of modules 10 meeting another plurality of conveyor systems 22 composed of a plurality of conveyor modules 10 going in a direction 90° from the direction of the first plurality of conveyor systems. At the corner, the rollers 12 are successively shortened in a step-wise fashion so that the two sets of conveyor systems meet in what approximates a mitre joint. Packages moving along the first series of conveyor systems, denoted by the numeral 120, to the second series of conveyor systems, denoted by the numeral 124, will automatically turn by 90° when they reach the joint. There is no need for a dead plate or any other inactive spot as in prior art conveyor systems, nor is there a need for a series of rollers turned in different directions to provide a gradual turn. Guide rails 126 can be provided in the usual manner, a guide rail such as that described in U.S. Pat. No. 3,491,873 being quite suitable.

Figure 12:
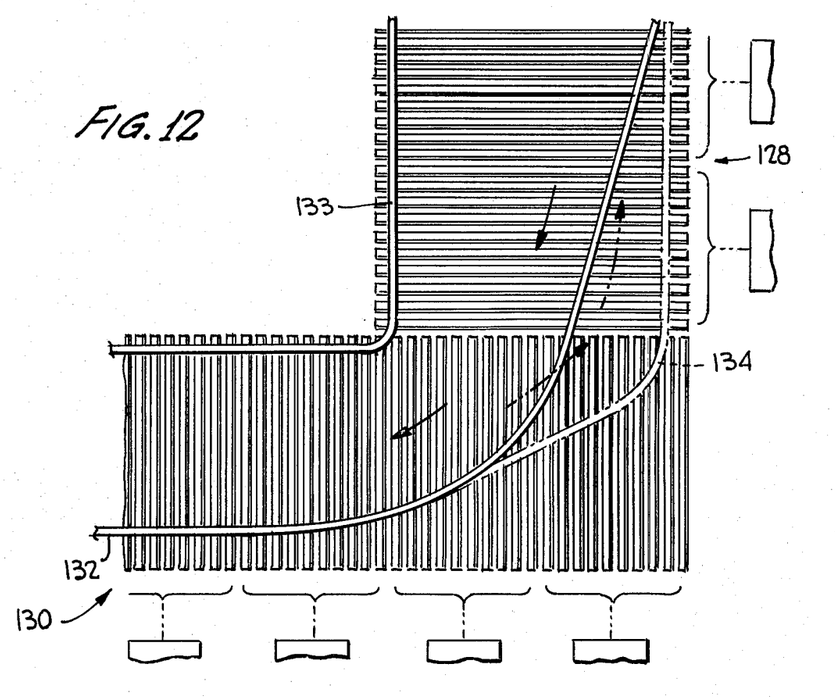
FIG. 12 is a diagrammatic top plan view of part of a conveyor system showing a right angle transfer.

Another application of the instant invention is shown in FIG. 12 wherein a first series of conveyor systems denoted as 128 butts up against a second series of conveyor systems denoted by the numeral 130. Articles traveling on conveyor 128 will pass from the rollers thereof onto the rollers of conveyor 130 and immediately change their direction by 90°. Again, there is no need for a dead plate or other inactive spot. It should be noted that the direction of movement is not necessarily from conveyor 128 to 130 but could be from conveyor 130 to conveyor 128.

Figure 13:
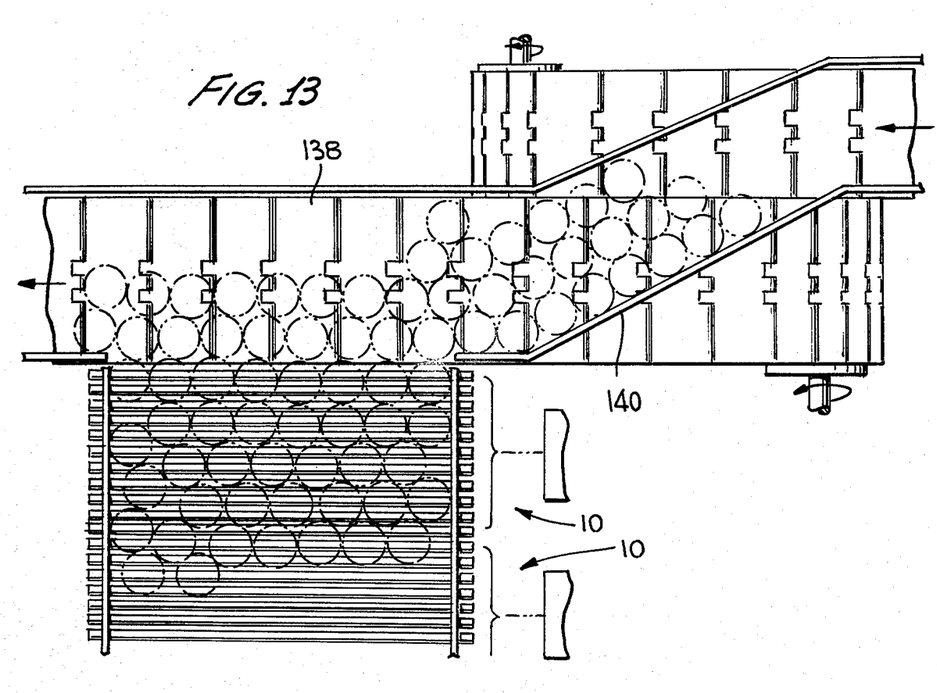
FIG. 13 is a diagrammatic top plan view of a storage, or accumulation, table utilizing the transfer mechanism of the instant invention.

In still another application as shown in FIG. 13, a collection or accumulation table 136 comprised of a plurality of modules 10, or a plurality of systems 22 is provided butting up against a conveyor 138 which could be a conventional belt conveyor or could be a conveyor constructed according to the present invention. The conventional conveyor depicted is the same as that shown in U.S. Pat. No. 3,927,757. By providing suitable guide rails 140, articles which are backed up on conveyor 138 for one reason or another can be guided on to accumulation table 136 for temporary storage until the blockage is cleared whereupon the articles would then be conveyed back on to conveyor 138 without use of dead plates in either direction. Suitable sensing and control means are provided to activate the drives of modules 10 in one direction or the other to collect or discharge the stored articles. A particular advantage of the instant construction over prior art accumulation tables which utilize a chain belt is that the package can easily slide along the rollers as well as passing from one roller to another whereas the friction of a standard chain belt will not allow this. In this instance, skewing of the packages is an advantage. In principal 136 could be a conveyor instead of a collection table.

Thus, it will be apparent after reading the foregoing detailed description that the objects of the invention initally set forth have been successfully achieved by reference to the presently preferred embodiments which are examplary and described in a limited sense only, the invention being limited only by the following claims.

Accordingly, what is claimed is:

1. A transfer mechanism for transporting articles, comprising:
(a) a plurality of parallel rollers disposed in a planar array and forming a conveyor;
(b) means for supporting said rollers for rotation; and
(c) means for driving said rollers, said drive means comprising:
(d) an input drive means having a drive transmitting surface;
(e) a plurality of drive takeoff members disposed in a circular array around the periphery of, and driven by, said drive means;
(f) a flexible coupling connecting each of said rollers with one of said takeoff members, whereby rotation of said takeoff members causes rotation of said rollers; and
(g) means for driving said input drive means, (h) adjustable torque clutch means operatively interposed between said last mentioned driving means and said input drive means.

2. A transfer mechanism as claimed in claim 1, wherein said supporting means comprise nylon bearings spaced apart a distance sufficient to prevent a bowing of said rollers when a downward force is applied to the same.

3. A transfer mechanism as claimed in claim 2, wherein each of said bearings comprises an elongated strip with a plurality of transverse roller supporting openings spaced apart along one longitudinal edge, said openings defining bearing surfaces on which said rollers rotate.

4. A transfer mechanism as claimed in claim 3, wherein said bearings further comprise a pair of mounting means on the other longitudinal edge, said mounting means each comprising a transverse circular opening, a slot opening downwardly and crossing said circular opening, a pair of depending resilient legs disposed on either side of said circular opening and on either side of said slot, the inside upper surface of said slot being convex, said supporting means further comprising a bearing support, said bearing support comprising a flat upwardly extending member having at least two pins extending transversely therethrough, each of said pins being of a diameter slightly larger than the smallest distance between each pair of said resilient legs, said legs being clamped over said pin, the top of said upwardly extending member being flat and contacting said convex surface to provide a small clearance on either side of the point of said contact and the thickness of said upwardly extending member being such that a small clearance is left between the same and the sides of said slot when said legs are clamped on said pin, said clearances thereby providing for self-alignment of said bearings.

5. A transfer mechanism as claimed in claim 1, wherein said input drive means is a drive gear and said plurality of drive takeoff members is a plurality of pinion gears.

6. A transfer mechanism as claimed in claim 5, wherein said means for driving said drive gear includes a drive shaft and a sprocket wheel rotatably mounted on said drive shaft and operatively connected to a prime mover; said drive gear is fixed to said drive shaft; and said adjustable torque clutch means comprises a pair of thrust washers fixed against radial movement on said drive shaft on either side of said sprocket wheel, at least one of said thrust washers being axially movable on said drive shaft, and biasing means causing said thrust washers to bear against said sprocket wheel, said biasing means being adjustable to provide for slippage between said sprocket wheel and said thrust washers when a predetermined pressure is applied to at least one of said rollers.

7. A transfer mechanism as claimed in claim 6, wherein said thrust washers are fabricated of a material having slippage characteristics such that the starting friction is close to the running friction.

8. A transfer mechanism as claimed in claim 7, wherein said material is sintered bronze.

9. A transfer mechanism claimed in claim 6, wherein said prime mover is a motor and is connected to said sprocket wheel by a chain.

10. A transfer mechanism as claimed in claim 6, wherein said prime mover is a motor and is connected to said sprocket wheel by a cog belt.

11. A transfer mechanism as claimed in claim 6, wherein said biasing means is a pneumatic piston and cylinder.

12. A transfer mechanism as claimed in claim 1, wherein said rollers are from 3/16 inch to 2 inches in diameter.

13. A transfer mechanism as claimed in claim 5, comprising up to ten rollers and up to ten pinion gears.

14. A transfer mechanism as claimed in claim 1, wherein said flexible coupling is a flexible shaft.

15. A conveyor system comprising a plurality of transfer mechanisms according to claim 1, 2, 3, 4, 6, 7, 8, 9, 10, 11, 12, 13, or 14, wherein the last roller of each said mechanism is spaced from the first roller of the next succeeding said mechanism at a distance equal to the distance between rollers in each said mechanism.

16. A conveyor system as claimed in claim 15, wherein at least one means for driving rollers is adapted to drive said rollers in either a forward direction or a reverse direction responsive to a predetermined load condition.

17. A conveyor as claimed in claim 15, wherein up to eight transfer mechanisms are driven by a single prime mover.

18. Drive means for a transfer mechanism for transporting containers which comprises a plurality of parallel rollers disposed in a planar array and forming a conveyor system, said drive means comprising:
(a) an input drive means having a drive transmitting surface;
(b) a plurality of drive takeoff members disposed in a circular array around the periphery of, and driven by, said drive means;
(c) a flexible coupling connecting each of said rollers with one of said takeoff members, whereby rotation of said takeoff members causes rotation of said rollers; and
(d) means for driving said input drive means,
(e) adjustable torque clutch means operatively interposed between said last mentioned driving means and said input drive means.

19. Drive means as claimed in claim 18, wherein said input drive means is a drive gear and said plurality of drive takeoff members is a plurality of pinion gears.

20. Drive means as claimed in claim 19, wherein said means for driving said drive gear includes a drive shaft and a sprocket wheel rotatably mounted on said drive shaft and operatively connected to a prime mover; said drive gear is fixed to said drive shaft; and said adjustable torque clutch means comprises a pair of thrust washers fixed against radial movement on said drive shaft on either side of said sprocket wheel, at least one of said thrust washers being axially moveable on said drive shaft, and biasing means causing said thrust washers to bear against said sprocket wheel, said biasing means being adjustable to provide for slippage between said sprocket wheel and said thrust washers when a predetermined pressure is applied to at least one of said washers.

21. Drive means as claimed in claim 20, wherein said thrust washers are fabricated of a material having slippage characteristics such that the starting friction is close to the running friction.

22. Drive means as claimed in claim 21, wherein said material is sintered bronze.

23. Drive means as claimed in claim 20, wherein said prime mover is a motor and is connected to said sprocket wheel by a chain.

24. Drive means as claimed in claim 20, wherein said prime mover is a motor and is connected to said sprocket wheel by a cog belt.

25. Drive means as claimed in claim 19 or 20, wherein said gears are fabricated of nylon.

26. Drive means as claimed in claim 19, 20, or 21, wherein said pinion gears are fixedly mounted on pinion shafts and said flexible shafts are each fixed to a respective pinion shaft.

27. Drive means as claimed in claim 20, wherein said biasing means is a pneumatic cylinder and piston.

* * * * *